United States Patent [19]

Yashiro et al.

[11] Patent Number: 4,699,840
[45] Date of Patent: Oct. 13, 1987

[54] MAGNETIC RECORDING MEDIUM

[75] Inventors: Tsutomu Yashiro; Mutsumu Kurihara; Hiroshi Togashi, all of Mito, Japan

[73] Assignee: Victor Company of Japan, Ltd., Japan

[21] Appl. No.: 781,107

[22] Filed: Sep. 27, 1985

[30] Foreign Application Priority Data

Oct. 1, 1984 [JP] Japan .................. 59-204028

[51] Int. Cl.$^4$ ............................................. G11B 5/714
[52] U.S. Cl. .................... 428/328; 252/62.55; 252/62.56; 252/62.63; 252/62.54; 427/128; 428/329; 428/403; 428/694; 428/900
[58] Field of Search ............... 428/694, 329, 695, 403, 428/900, 328; 427/131, 128; 252/62.54, 62.55, 62.56, 62.63; 360/134–136

[56] References Cited

U.S. PATENT DOCUMENTS

| 4,239,637 | 12/1980 | Naruse | 427/128 |
| 4,425,401 | 1/1984 | Ido | 428/694 |
| 4,442,159 | 4/1984 | Dezawa | 428/900 |
| 4,565,726 | 1/1986 | Oguchi | 428/329 |

FOREIGN PATENT DOCUMENTS 57-212623 12/1982 Japan.
58-203625 11/1983 Japan.

Primary Examiner—Ellis P. Robinson
Attorney, Agent, or Firm—Andrus, Sceales, Starke & Sawall

[57] ABSTRACT

A magnetic recording medium has a magnetic layer which is made of a magnetic material constituted by a mixture of hexagonal system ferrite magnetic particles and acicular ferromagnetic particles.

6 Claims, 3 Drawing Figures

MAGNETIC RECORDING MEDIUM

BACKGROUND OF THE INVENTION

The present invention generally relates to magnetic recording mediums such as magnetic tapes and magnetic discs, and more particularly to a magnetic recording medium having a magnetic material thereof selected to a material which is suited for high density recording.

Conventionally, acicular ferromagnetic particles are generally used as magnetic particles which constitute a coated magnetic layer of a magnetic tape for recording and reproducing video signals thereon and therefrom. The acicular ferromagnetic particles are arranged in the longitudinal direction of a base film of the magnetic tape.

However, when the wavelength of a signal which is to be recorded is short, the conventional magnetic tape described above is disadvantageous in that the self-demagnetization effect of the recording magnetization is large and the reproduced output level decreases. The shorter the wavelength of the signal which is to be recorded becomes, the larger the self-demagnetization effect becomes and the more the reproduced output level decreases. Accordingly, the conventional magnetic tape is not suited for high density recording.

On the other hand, there is another conventional magnetic tape which is used in a vertical magnetic recording system which is intended for the high density recording. In this other conventional magnetic tape, hexagonal system ferrite magnetic particles are arranged with the c-axis thereof perpendicular to a surface of the base film. According to this magnetic tape, there is not much problem of the self-demagnetization even when the wavelength of the signal which is to be recorded is short. However, in the case where a ring magnetic head is used for the recording and reproduction of the signal, the magnetic field generated by the magnetic head in the longitudinal direction of the magnetic tape cannot be used effectively and the reproduced output level decreases. The decrease in the reproduced output level is considerably large especially with respect to a signal which has a long wavelength and is dominated by a component of the recording magnetization in the longitudinal direction of the magnetic tape. In addition, even with respect to a signal having a short wavelength, it is necessary to use a large recording current in order to obtain a large reproduced output level because the magnetic field generated by the magnetic head is smaller in the vertical direction compared to that in the longitudinal direction of the magnetic tape. As a result, the problem of saturation occurs and there is a disadvantage in that an accurate recording cannot be carried out.

SUMMARY OF THE INVENTION

Accordingly, it is a general object of the present invention to provide a novel and useful magnetic recording medium in which the disadvantages described heretofore are eliminated.

Another and more specific object of the present invention is to provide a magnetic recording medium comprising a magnetic layer made of magnetic particles in which hexagonal system ferrite magnetic particles and acicular ferromagnetic particles are admixed. The magnetic recording medium according to the present invention is suited for the high density recording, and it is possible to obtain a large reproduced output level even when a ring magnetic head is used.

Other objects and further features of the present invention will be apparent from the following detailed description when read in conjunction with the accompanying drawings.

DETAILED DESCRIPTION

Figure 1:
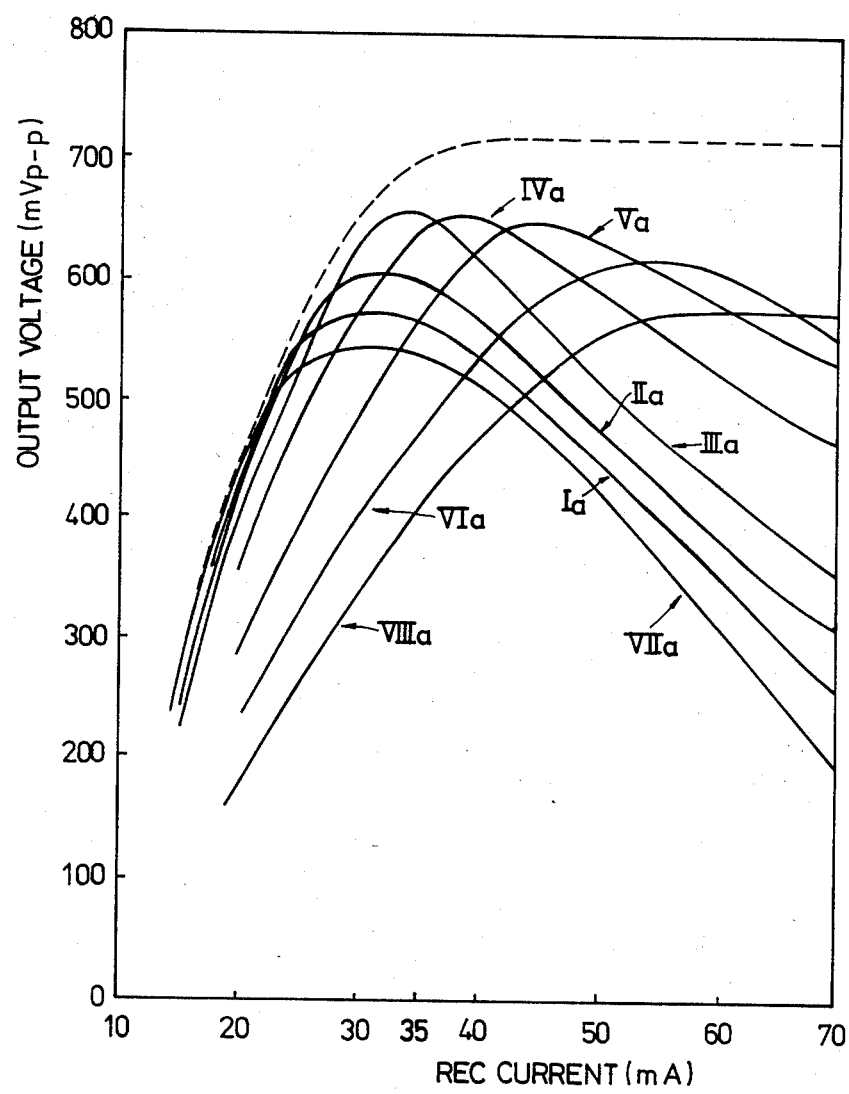
FIG. 1 is a graph showing recording current versus reproduced output voltage characteristics of each of embodiments of the magnetic recording medium according to the present invention for the case where a carrier frequency of a recording signal is equal to 4 MHz.

The present inventors found that a magnetic recording medium becomes suited for high density recording and a large reproduced output level can be obtained even when a ring magnetic head is used, when a mixture of hexagonal system ferrite magnetic particles and acicular ferromagnetic particles is used as magnetic particles constituting a magnetic layer of the magnetic recording medium.

The hexagonal system ferrite magnetic particles are hexagonal crystals such as $MO(Fe_2O_3)_6$, for example, where M is Ba, Sr, Ca or the like. A part of Fe may be substituted by other transition metal elements. For example, $\gamma$-$Fe_2O_3$, Co adsorbed $\gamma$-$Fe_2O_3$, $Fe_3O_4$, $CrO_2$, Fe, Co, alloy particles or the like may be used as the acicular ferromagnetic particles.

Description will hereunder by given with respect to each of the embodiments of the present invention.

[FIRST EMBODIMENT]

A magnetic paint is made by sufficiently dispersing a mixture containing 2 weight percent of hexagonal system barium ferrite particles (average particle diameter of approximately 0.1 μm, coercive force of approximately 550 Oe, saturation magnetization of approximately 54.5 emu/g), 98 weight percent of Co adsorbed $\gamma$-$Fe_2O_3$ magnetic particles (aspect ratio of approximately 10, magnetic saturation of approximately 75 emu/g, coercive force of approximately 580 Oe, BET specific surface area of approximately 40 m²/g), 30 weight percent of a binder, 1 weight percent of a disperser, 10 weight percent of an abrasive, 8 weight percent of carbon black, 0.5 weight percent of a lubricant, and 300 weight percent of a solvent. This magnetic paint is coated on a polyethylene terephthalate film, and is slit into widths of ½ inch after a calender process so as to form a magnetic tape for video signal recording and reproduction (hereinafter simply referred to as a video tape).

The orientation process is not performed by use of a magnetic field but by use of a mechanical orientation alone.

[SECOND EMBODIMENT]

A video tape is formed similarly by using 5 weight percent of hexagonal system barium ferrite particles and 95 weight percent of Co adsorbed $\gamma$-$Fe_2O_3$ magnetic particles in the first embodiment described before.

[THIRD EMBODIMENT]

A video tape is formed similarly by using 10 weight percent of hexagonal system barium ferrite particles and 90 weight percent of Co adsorbed $\gamma$-$Fe_2O_3$ magnetic particles in the first embodiment described before.

[FOURTH EMBODIMENT]

A video tape is formed similarly by using 20 weight percent of hexagonal system barium ferrite particles and 80 weight percent of Co adsorbed $\gamma$-$Fe_2O_3$ magnetic particles in the first embodiment described before.

[FIFTH EMBODIMENT]

A video tape is formed similarly by using 40 weight percent of hexagonal system barium ferrite particles and 60 weight percent of Co adsorbed $\gamma$-$Fe_2O_3$ magnetic particles in the first embodiment described before.

[SIXTH EMBODIMENT]

A video tape is formed similarly by using 60 weight percent of hexagonal system barium ferrite particles and 40 weight percent of Co adsorbed $\gamma$-$Fe_2O_3$ magnetic particles in the first embodiment described before.

[FIRST COMPARISON EXAMPLE]

A video tape is formed similarly by using no hexagonal system barium ferrite particles and 100 weight percent of Co adsorbed $\gamma$-$Fe_2O_3$ magnetic particles in the first embodiment described before. However, in the present example, an orientation process is performed in the longitudinal direction by use of opposing magnetic fields.

[SECOND COMPARISON EXAMPLE]

A video tape is formed similarly by using 100 weight percent of hexagonal system barium ferrite particles and no Co adsorbed $\gamma$-$Fe_2O_3$ magnetic particles in the first embodiment described before.

Figure 2:
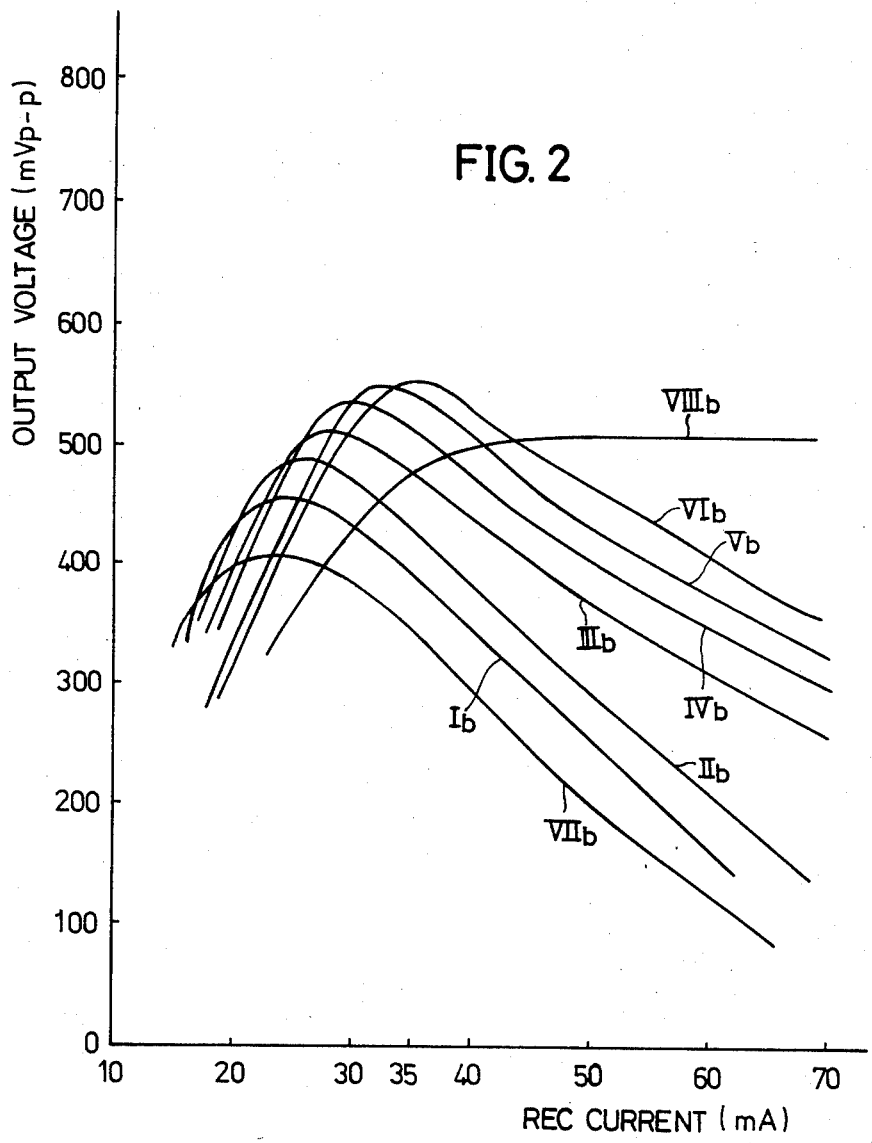
FIG. 2 is a graph showing recording current versus reproduced output voltage characteristics of each of embodiments of the magnetic recording medium according to the present invention for the case where a carrier frequency of a recording signal is equal to 6 MHz.

FIGS. 1 and 2 show input versus output characteristics of the magnetic tapes according to the first through sixth embodiments and the first and second comparison examples for the cases where the carrier frequency of a frequency modulated (FM) signal which is to be recorded (hereinafter simply referred to as an FM recording signal) is equal to 4 MHz and 6 MHz, respectively. In FIGS. 1 and 2, the abscissa indicates the recording current (mA) and the ordinate indicates the reproduced output voltage ($mV_{p-p}$). Further, the characteristics of the first through sixth embodiments are indicated by curves Ia through VIa in FIG. 1 and by curves Ib through VIb in FIG. 2, and the characteristics of the first and second comparison examples are indicated by curves VIIa and VIIIa in FIG. 1 and by curves VIIb and VIIIb in FIG. 2.

According to the first comparison example, the reproduced output level decreases due to the self-demagnetization effect when the recording current is increased. The recording current of the existing video tape recorder is set to approximately 35 mA. Hence, as is clear from the curves VIIa and VIIb, the reproduced output level is close to the peak level in the case where the carrier frequency of the FM recording signal is equal to 4 MHz, but the reproduced output level greatly decreases and becomes considerably small compared to that for the case where the carrier frequency is equal to 4 MHz when the carrier frequency of the FM recording signal is equal to 6 MHz. Thus, it is seen that the video tape according to the first comparison example is not suited for high density recording.

According to the second comparison example, a decrease in the reproduced output level due to the self-demagnetization effect cannot be detected. However, as may be seen from the curve VIIIa, the reproduced output level is small in the case where the carrier frequency of the FM recording signal is equal to 4 MHz. When an attempt is made to increase the recording current, problems occur since a saturation is reached in the ring magnetic head.

On the other hand, according to each of the first through sixth embodiments, the reproduced output level is large compared to that of the comparison examples regardless of whether the carrier frequency of the FM recording signal is equal to 4 MHz or 6 MHz. Accordingly, the video tapes according to the first through sixth embodiments are suited for the high density recording.

Figure 3:
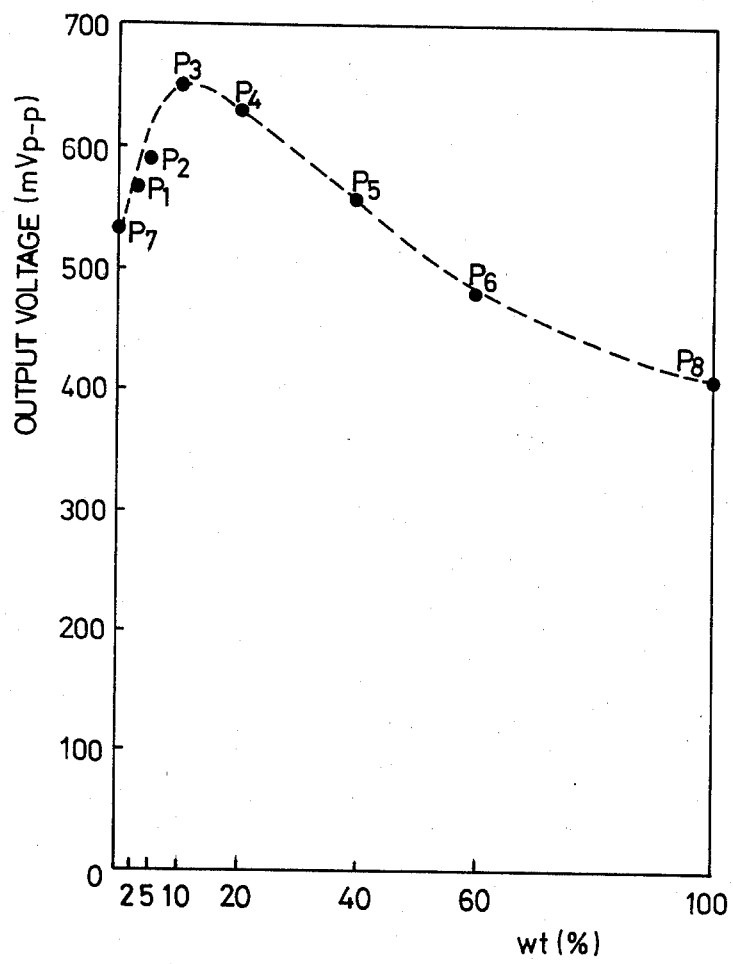
FIG. 3 is a graph showing a relationship between a reproduced output voltage and a weight percent occupied by barium ferrite within magnetic particles which are used as the magnetic material of the magnetic recording medium.

When the recording demagnetization does not occur, it is thought that the acicular ferromagnetic particles have an input versus output characteristic indicated by a phantom line in FIG. 1. When the hexagonal system ferrite magnetic particles are admixed to the acicular ferromagnetic particles, the vertical magnetization component acts to suppress the recording demagnetization and it becomes possible to improve the reproduced output level. This effect of suppressing the recording demagnetization becomes more notable as the weight percent of the hexagonal system ferrite magnetic particles which are admixed to the acicular ferromagnetic particles increases. In the second comparison example where 100 weight percent of the hexagonal system ferrite magnetic particles are used, no recording demagnetization can be detected. However, the magnetic saturation of the hexagonal system ferrite magnetic particles is small compared to that of the acicular ferromagnetic particles. In the case where the carrier frequency of the FM recording signal is equal to 4 MHz, a maximum reproduced output level is obtained among the six embodiments when 10 weight percent of hexagonal system ferrite magnetic particles is used in the third embodiment. In the existing video tape recorders which are manufactured and marketed, the carrier frequency of the FM recording signal is set to 4 MHz and the recording current is set to 35 mA. Accordingly, a graph shown in FIG. 3 is obtained when the reproduced output voltages for different weight percent of the hexagonal system ferrite magnetic particles are plotted for the case where the carrier frequency of the FM recording signal is equal to 4 MHz and the recording current is equal to 35 mA. In FIG. 3, points P1 through P6 indicate the reproduced output voltages obtained in the first through sixth embodiments and points P7 and P8 indicate the reproduced output voltages obtained in the first and second comparison examples. The video tape according to the sixth embodiment is not preferable as a video tape for high density recording. Any one of the video tapes according to the first through fifth embodiments may be used as a video tape for high density recording, however, the composition of the third embodiment is most preferable.

It is important that the average particle diameter of the hexagonal ferrite magnetic particles is approximately equal to or less than 0.2 μm. Hence, when the average particle diameter of the hexagonal ferrite magnetic particles is over approximately 0.2 μm and is too large, the noise becomes large with respect to a recording signal having a short wavelength due to the particle size effect. In other words, when the wavelength of the recording signal becomes too short, the number of barium ferrite particles entering within one wavelength of the recording signal becomes small, and the noise is generated because the waveform of the recording signal is recorded in a distorted state.

It is also important that the coercive force of the hexagonal system ferrite magnetic particles is in a range of approximately 300 Oe to 600 Oe, and preferably in a range of approximately 450 Oe to 580 Oe. In other words, when the coercive force is over 600 Oe and is too large, the coercive force in the vertical direction becomes too large in the magnetic layer of the video tape. In this case, it becomes difficult to carry out a recording by use of the ring magnetic head, and the erasing characteristic becomes poor. On the other hand, when the coercive force is under 300 Oe and is too small, it becomes difficult to make the c-axis of the hexagonal system ferrite magnetic particles an axis of easy magnetization due to a demagnetizing field acting on the hexagonal magnetic particles. In this case, the vertical magnetization component becomes greatly reduced. In addition, it is preferable that the saturation magnetization of the hexagonal system ferrite magnetic particles is approximately equal to or greater than 50 emu/g.

As for the acicular ferromagnetic particles, it is important that the aspect ratio is greater than or equal to 5. When the aspect ratio is less than 5, the shape anisotropy becomes too small, and the coercive force dependent on the shape anisotropy becomes too small. Further, when the aspect ratio is less than 5 and the aspect ratio is inconsistent, the coercive force becomes more inconsistent. As a result, the force to maintain the recording magnetization in the longitudinal direction is weak, and the component of the recording magnetization in the longitudinal direction is small. In addition, it is preferable that the magnetic saturation of the acicular ferromagnetic particles is approximately equal to or greater than 70 emu/g. When the saturation magnetization of the acicular ferromagnetic particles is less than 70 emu/g and is too small, the reproduced output level decreases and the video tape becomes unsuited for practical use.

From the point of view of obtaining a satisfactory dispersion when admixing the hexagonal system ferrite magnetic particles and the acicular ferromagnetic particles, it is preferable that the BET specific surface area of the acicular ferromagnetic particles is in a range of approximately 20 $m^2/g$ to 60 $m^2/g$. In other words, in the case where the BET specific surface area is less than 20 $m^2/g$ and is too small or in the case where the BET specific surface area is greater than 60 $m^2/g$ and is too large, a satisfactory dispersion cannot be obtained because of the considerable difference between the shapes of the acicular ferromagnetic particles and the hexagonal system ferrite magnetic particles.

Further, the present invention is not limited to these embodiments, but various variations and modifications may be made without departing from the scope of the present invention.

What is claimed is:

1. A magnetic recording medium comprising;
    a recording medium base; and
    a magnetic layer formed on said recording medium base, said magnetic layer being made of a magnetic material, said magnetic material being constituted by such a mixture of hexagonal system ferrite magnetic particles and acicular ferromagnetic particles that a weight percent occupied by said hexagonal system ferrite magnetic particles within said mixture is selected in a range of 2 to 60,
    said hexagonal system ferrite magnetic particles having an average particle diameter less than or equal to 0.2 μm and a coercive force in a range of more than 300 Oe and less than 600 Oe,
    said acicular ferromagnetic particles having an aspect ratio greater than or equal to, a magnetic saturation greater than or equal to 70 emu/g, and a BET specific surface area in a range of 20 $m^2/g$ to 60 $m^2/g$.

2. A magnetic recording medium as claimed in claim 1 in which a weight percent occupied by said hexagonal system ferrite magnetic particles within said mixture is selected to 10.

3. A magnetic recording medium as claimed in claim 1 in which said hexagonal system ferrite magnetic particles have a magnetic saturation greater than or equal to 50 emu/g.

4. A magnetic recording medium as claimed in claim 1 in which said hexagonal system ferrite magnetic particles have a coercive force in a range of 450 Oe to 580 Oe.

5. A magnetic recording medium as claimed in claim 1 in which said hexagonal system ferrite magnetic particles are $MO(Fe_2O_3)_6$, where M is one of Ba, Sr, and Ca.

6. A magnetic recording medium as claimed in claim 1 in which said acicular ferromagnetic particles is selected out of a group of $\gamma\text{-}Fe_2O_3$, Co adsorbed $\gamma\text{-}Fe_2O_3$, $Fe_3O_4$, $CrO_2$, Fe, Co, and alloy particles.

* * * * *